# 2,693,467
DYESTUFFS OF THE DIOXAZINE SERIES

Walter Anderau, Binningen, and Karl Seitz, Basel, Switzerland, assignors to Ciba Limited, Basel, Switzerland, a Swiss firm No Drawing. Application May 4, 1953,
Serial No. 352,964

Claims priority, application Switzerland May 17, 1952

4 Claims. (Cl. 260—246)

The present invention provides new dyestuffs of the dioxazine series which, for example, like the dyestuff of the formula (1)
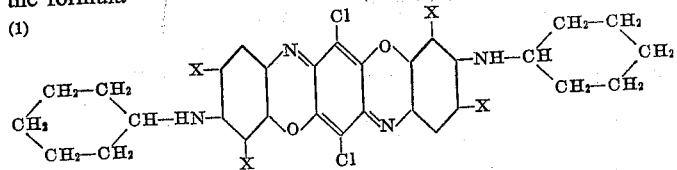

(in which one of the two substituents X bound to the same benzene nucleus is a sulfonic acid group and the other a chlorine atom) correspond to the general formula (2)
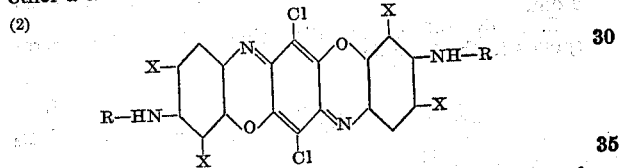

in which R represents a cycloalkyl radical, and one of the two substituents X bound to the same benzene nucleus represents a sulfonic acid group and the other a substituent incapable of salt formation.

The new dyestuffs of the formula (2) are made in accordance with the invention by treating with an agent capable of bringing about ring closure a compound of the formula (3)
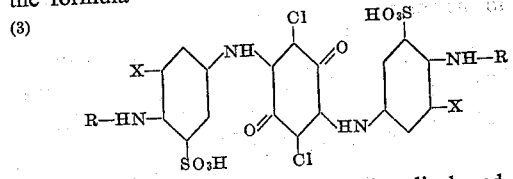

in which R represents a cycloalkyl radical and X represents a substituent incapable of salt formation.

The compounds of the formula (3) sering as starting materials can be obtained by condensing one mol of 2:3:5:6-tetrachloroquinone (chloranil) with 2 mols of a compound of the formula (4)
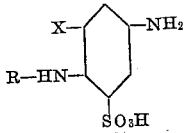

in which R and X have the meaning already given. The compounds of the formula (4) in which R represents a cyclohexyl radical, and X represents a halogen atom, for example, a bromine atom or especially a chlorine atom, are particularly valuable.

The compounds of the formula (4) are advantageously prepared by condensing an alkali salt of a 2-halogen-5-nitrobenzene-1-sulfonic acid, which contains in the 3-position a substitutent incapable of salt formation, for example an alkali salt of 2:3-dichloro-5-nitro-1-sulfonic acid or 2:3-dibromo-5-nitrobenzene-1-sulfonic acid, with a cycloalkylamine, and reducing the nitro group in the product so obtained to an amino group. The condensation is advantageously carried out in an aqueous medium with the addition of an acid-binding agent, such, for example, as magnesium oxide, at a raised temperature, for example, under superatmospheric pressure at a temperature within the range of 120–200° C. The reduction of the nitro group can be carried out in known manner, for example, by means of iron.

The condensation of the resulting 2-cycloalkylamino-5-amino-1-sulfonic acid of the formula (4) containing a further substituent as aforesaid with 2:3:5:6-tetrachloroquinone is likewise carried out with advantage in an aqueous medium with the addition of an acid-binding agent, advantageously at a slightly raised temperature, for example, at about 60° C.

The treatment of the resulting compounds of the formula (3) with an agent capable of bringing about ring closure may be carried out in a manner in itself known with the use of an agent capable of bringing about ring closure which by virtue of its oxidizing action is capable of converting quinones having the atomic grouping

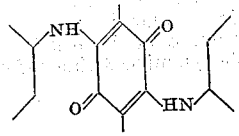

into the corresponding dioxazines having the atomic grouping

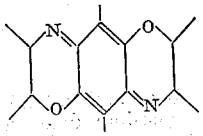

Especially suitable for this purpose is sulfuric acid containing free sulfur trioxide (oleum); the content of sulfur trioxide in the oleum may vary within wide limits e. g. from 5–65 per cent. Good results are generally obtained with an oleum containing about 5 to 24 per cent. of free sulfur trioxide. Ring closure with the use of oleum may be carried out, for example, at a temperature of 10–25° C., or there may be required, for example, temperatures up to about 90° C. If desired, the oleum may be replaced wholly or in part by chlorosulfonic acid.

The dioxazine may be isolated from the acid reaction mixture advantageously by diluting the mixture with water or pouring it on to ice, and filtering off the precipitated dyestuff. The dyestuff may be purified by dissolution in water with the addition of an alkali, for example, an alkali carbonate, if desired, filtering the solution, and salting out the dyestuff. The dyestuff is then converted into an alkali salt such as is well suited for dyeing. As compared with other direct-dyeing dyestuffs of the dioxazine series the products of this invention have the advantage, on the one hand, that ring closure can be brought about in a very simple manner and, on the other, that dyestuffs having a good affinity for cellulose fibers are obtained directly, that is to say, without the subsequent partial splitting off of sulfonic acid groups.

The new dyestuffs of the above formula (2) are suitable for dyeing and printing a very wide variety of materials, for example, those of animal origin such as leather, silk and wool, or artificial fibers of casein, or of superpolyamides or superpolyurethanes. As stated above, they have an especially good affinity for cellulose-containing materials such as paper, linen, cotton and materials consisting of regenerated cellulose such as artificial silk, staple fibers or foils of regenerated cellulose. The dyeings produced on cellulose-containing materials with the new dyestuffs are distinguished by the high purity of their tints, which are usually reddish blue, and also by their good fastness to light. In general the fastness to light of the dyeings remains substantially unimpaired by the usual treatments with anti-creasing agents.

The following examples illustrate the invention, the parts and percentages being by weight:

Example 1

10 grams of the compound of the formula

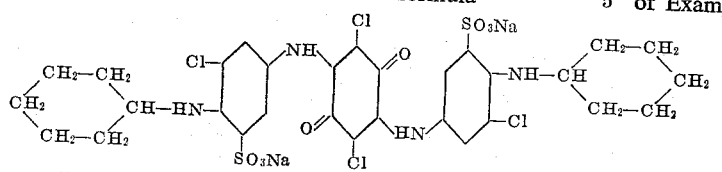

are dissolved in 200 parts of oleum of 24 per cent. strength, and the whole is heated for one hour at 90–95° C., while stirring. The deep blue solution is then poured on to 700 parts of ice, and the precipitated dyestuff is filtered off. The dyestuff is stirred in 300 parts of water, the solution is rendered neutral with sodium carbonate or another alkali, and the dyestuff is completely precipitated by means of 60 parts of sodium chloride. The product is then filtered off and dried.

The dyestuff is a dark powder which dissolves in water with a violet coloration, and dyes cotton, artificial silk of regenerated cellulose and paper pure reddish blue tints having a very good fastness to light.

The compound of the above formula is prepared by heating 147 parts of sodium 5-nitro-2:3-dichloro-1-sulfonate with 52 parts of cyclohexylamine and 11 parts of magnesium oxide in 600 parts of water for 5 hours at 160–165° C. in an autoclave, and the condensation product is then reduced in the usual manner with iron to yield 2-cyclohexylamino-3-chloro-5-aminobenzene-1-sulfonic acid.

60.9 parts of the above amine, 24.6 parts of chloranil and 9.3 parts of magnesium oxide are stirred in 300 parts of water for 6 hours at 60–65° C. The precipitated condensation product is then filtered off, washed with water until the filtrate becomes colorless, and dried in vacuo at 70–80° C.

Example 2

A dyestuff similar to that described in Example 1, is obtained by treating the compound of the formula

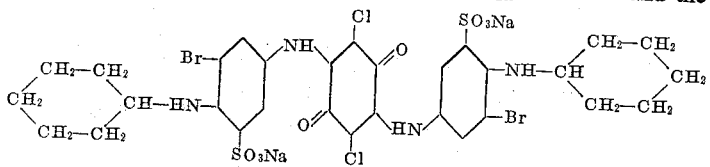

with oleum of 24 per cent. strength. The starting material is prepared by condensing 1 mol of chloranil with 2 mols of sodium 2-cyclohexylamino-3-bromo-5-aminobenzene-1-sulfonate, which has been obtained by condensing cyclohexylamine with 5-nitro-2:3-dibromobenzene-1-sulfonic acid or with 5-nitro-2-chloro-3-bromobenzene-1-sulfonic acid, and subsequently reducing with iron the product so obtained.

Example 3

100 parts of cotton are entered at 50° C. into a dyebath which contains in 3000 parts of water 1 part of the dyestuff obtainable as described in the first paragraph of Example 1. The temperature is raised to 90° C. in the course of ½ hour, and 30 parts of crystalline sodium sulfate are added. The dyeing is then carried on for one hour at 90–95° C. and there is obtained a pure reddish blue dyeing of very good fastness to light.

What is claimed is:

1. A dyestuff of the dioxazine series which corresponds to the formula

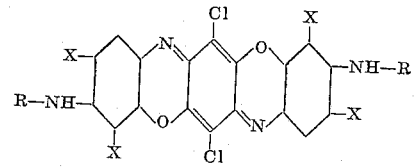

in which R represents a cyclohexyl radical, and one of the two substituents X bound to the same benzene nucleus represents a sulfonic acid group and the other a halogen atom.

2. A dyestuff of the dioxazine series which corresponds to the formula

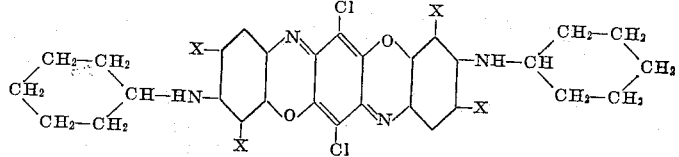

in which one of the two substituents X bound to the same benzene nucleus represents a sulfonic acid group and the other represents a member selected from the group consisting of a bromine and a chlorine atom.

3. A dyestuff of the dioxazine series which corresponds to the formula

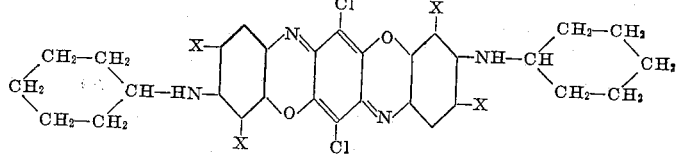

in which one of the two substituents X bound to the same benzene nucleus represents a sulfonic acid group and the other represents a bromine atom.

4. A dyestuff of the dioxazine series which corresponds to the formula

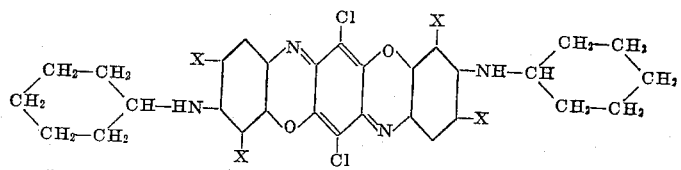

in which one of the two substituents X bound to the same benzene nucleus represents a sulfonic acid group and the other represents a chlorine atom.

No references cited.